No. 765,290. PATENTED JULY 19, 1904.
M. KORTH.
TIRE COVER.
APPLICATION FILED APR. 1, 1904.
NO MODEL.
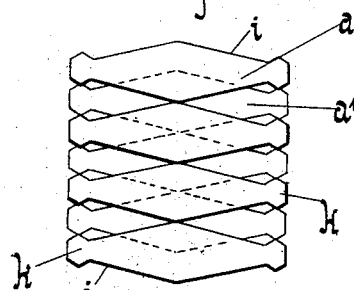
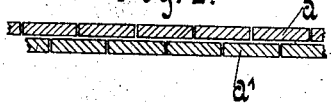
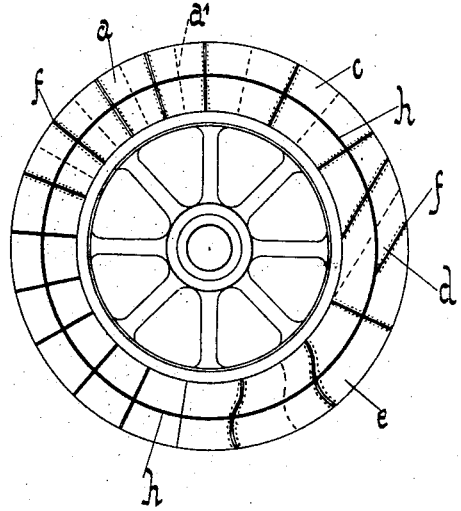
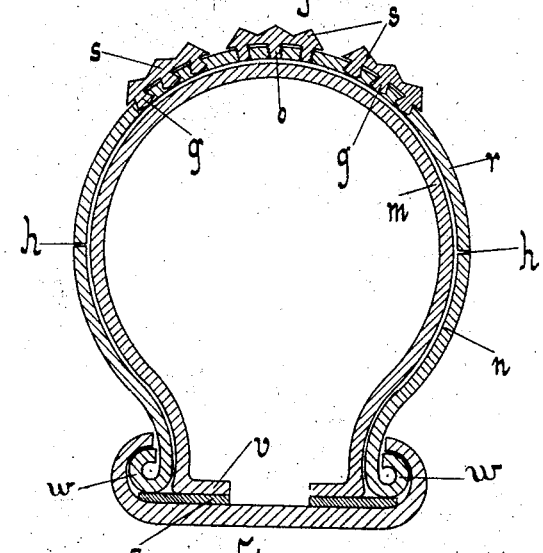
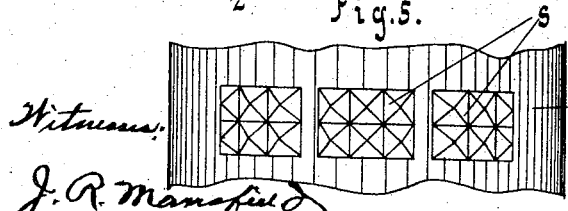
Witnesses:
J. R. Mansfield
L. E. Witham.
Inventor:
Martin Korth,
By:
Alexander N Dowell
Attorneys.

No. 765,290.                                                                Patented July 19, 1904.

UNITED STATES PATENT OFFICE.

MARTIN KORTH, OF COLOGNE-RADERBERG, GERMANY.

TIRE-COVER.

SPECIFICATION forming part of Letters Patent No. 765,290, dated July 19, 1904.

Application filed April 1, 1904. Serial No. 201,191. (No model.)

*To all whom it may concern:*

Be it known that I, MARTIN KORTH, a subject of the Emperor of Germany, residing at 196 Raderbergerstrasse, Cologne-Raderberg, Germany, have invented certain new and useful Improvements in the Manufacture of Tire-Covers, of which the following is a specification.

This invention relates to a method of production of a leather cover for wheels of vehicles, especially for those of automobiles.

Great difficulties are met with in shaping leather, especially sole-leather, so that it may assume a synclastic curved surface and remain in this condition, apart from the fact that the strips of the better qualities of leather required are very expensive and the cutting into long strips does not permit economical employment of the entire hide.

Under the present invention a leather cover is prepared from the best quality of sole-leather without dressing, each separate piece being stamped or cut of special form and joined with the others in suitable manner.

The invention is illustrated in the accompanying drawings, in which—

Figure 1 is a detail plan showing a series of superposed leather plates. Fig. 2 is a transverse section of the same. Fig. 3 is a side elevation of a pattern-wheel from which the cover is shaped. Fig. 4 is a transverse section of a vehicle-wheel rim fitted with its tire. Fig. 5 is a detail plan view showing a modification.

Plates or shields $a$ of substantially rhombic shape are stamped from a piece of sole-leather, Fig. 1. Where larger pieces are employed the leather is first bent into suitable form without being dressed and then is exactly cut after the curve of the wheel. The plates $a$ are then laid together on a model-wheel corresponding to the measurements of the tire to be produced, or if the tread is not to project from the rest of the tire these plates are placed in a grooved way in the model-wheel and firmly pressed together. There is thus produced a strip consisting of rhombic pieces with their obtuse corners abutting. Above the layer is set a second layer formed in the same way and the abutting obtuse corners of the component plates $a'$ of which lie over the centers of the rhombic pieces $a$ beneath. The two layers are united by wooden pegs, wire pins, or other connecting devices, as is common in shoe manufacture and the outer ends are likewise connected together so as to form a closed circle.

In order that the tire may also be substantially circular in cross-section, the corners of the plates $a$ $a'$, at the acute angles, which are each provided with an enlargement $k$, are bent so as to form an annular collar. With this formation the edges $i$ of the plates are brought together so that joints $f$ are formed on the finished cover, Fig. 3. If, however, the tire is to have an interchangeable tread, in which case it may also be of rubber, the inner part of the tire is formed in the above-described manner, as is also the separate tread, which is set into a recess in the former, so that a circular groove $h$ apparent on the outside is formed. According to the form of the plates the joint $f$ may assume a radial, inclined, or curved position. The plates themselves may be of any suitable size as is required for the particular case. (Shown in Fig. 3 by the parts $c$, $d$, and $e$.) Although this leather cover possesses a much greater security against side-slipping than is the case with other leather or rubber tires, there may further be affixed to the tread a metal protector, as shown in Fig. 5, which is permanently secured by having the pins or studs $g$ entering the leather of wedge shape or double conical or double-pyramidical formation, the orifices formed in the leather being of smaller dimensions than the greatest diameter of the stud, or instead the pin may be of corrugated section, as shown at $o$. As is known, the leather is so flexible that on the pins being forced in it yields and then draws together again to securely grip the pins and prevent the protector from falling away.

It is indifferent in carrying out the above process to what sort of tire this leather cover is attached, whether it be pneumatic, cushion, or of other type, the leather cover serving to prevent puncture, as also skidding of the wheel. In Fig. 4 $m$ denotes the lower layer of the plates and $n$ the upper layer. $r$ denotes the tread portion prepared in the same manner as the layer *m*, with the groove *h* between it and the part *n* and having metal protectors *s*, the tread part *r* being detachably secured by clamps to the layer *n*.

The tire is secured to the rim in the following manner: The outer ends *w* of the upper layer are bent outward, as shown, and those *v* of the lower layer are bent in the opposite direction. Both edges are then sewed onto a straight leather strip *z*, which is bent to suit the periphery of the wheel.

The lozenge shape of the leather pieces *a* is to be regarded merely as taken by way of example.

What I claim, and desire to secure by Letters Patent of the United States, is—

1. The herein-described method of manufacturing leather covers for vehicle-wheel rims consisting in cutting a number of plates or pieces of undressed leather, disposing these in a continuous row on an annular shape, superposing thereon a second layer of like pieces with their edges overlapping, uniting the layers and pressing the cover into shape.

2. The herein-described method of manufacturing leather covers for vehicle-wheels consisting in stamping from a sheet rhombic-shaped plates of sole-leather the plates having enlargements on their acute ends, disposing the plates in a continuous row with abutting obtuse corners on an annular shape, and pressing the same to the shape of the tire, superposing thereon a like layer of plates with the abutting corners overlying the central points of the lower plates, joining the two layers and bending over the acute corners to suit the rim of the wheel.

3. The herein-described method of manufacturing leather covers for vehicle-wheels consisting in cutting a number of plates of leather of rhombic shape, disposing these in a continuous row on an annular shape, superposing a second layer of plates thereon, the abutting corners of the second layer being over the middle points of the lower layer, joining these layers, pressing them to form a synclastically-curved surface, boring orifices in the leather and inserting metal protectors.

4. The improved cover for vehicle-wheels comprising a continuous annular row of rhombic-shaped leather plates having their obtuse corners abutting, a like superposed row having their abutting obtuse corners overlying the middle points of the lower row, the two layers being joined and curved to present a synclastic surface, and metal protectors engaging the leather as shown and described.

In testimony whereof I have signed my name to this specification in the presence of two subscribing witnesses.

MARTIN KORTH.

Witnesses:
GUSTAV ELSUER,
WILHELM KUEPPERS.